Oct. 11, 1927.

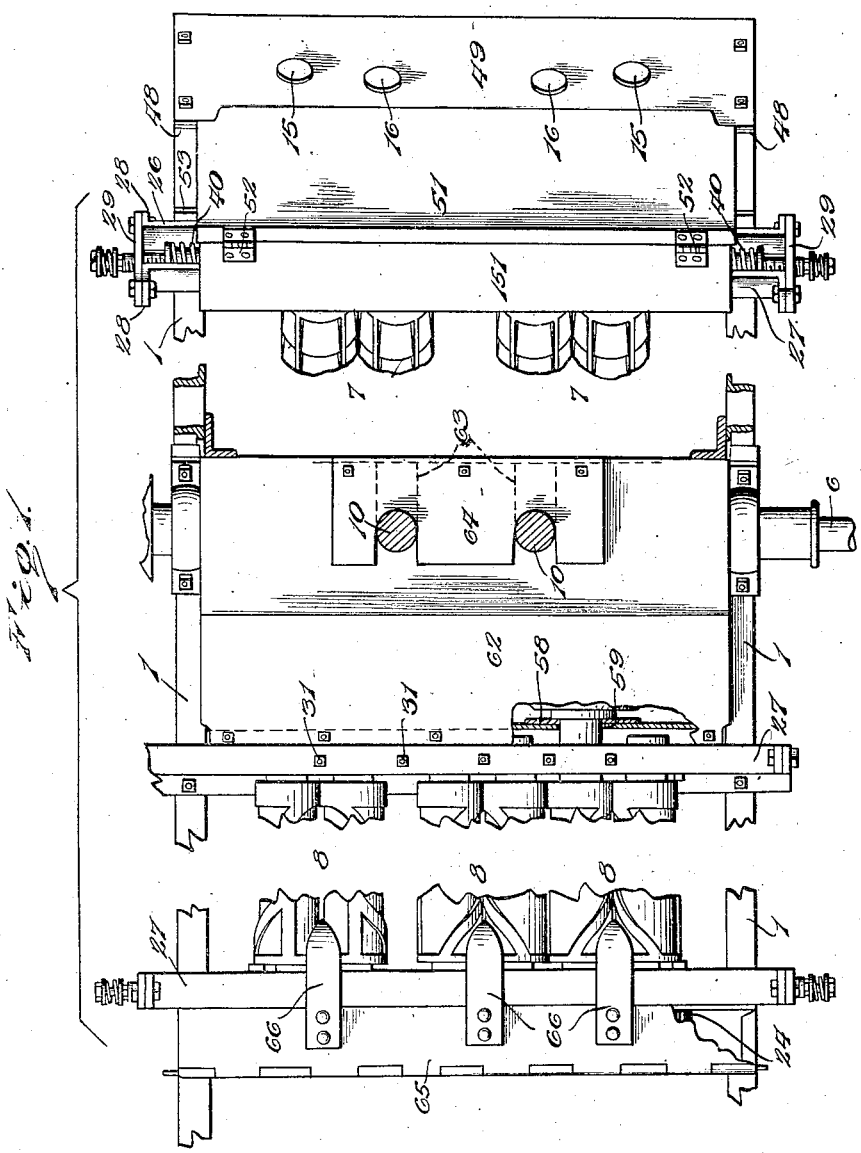

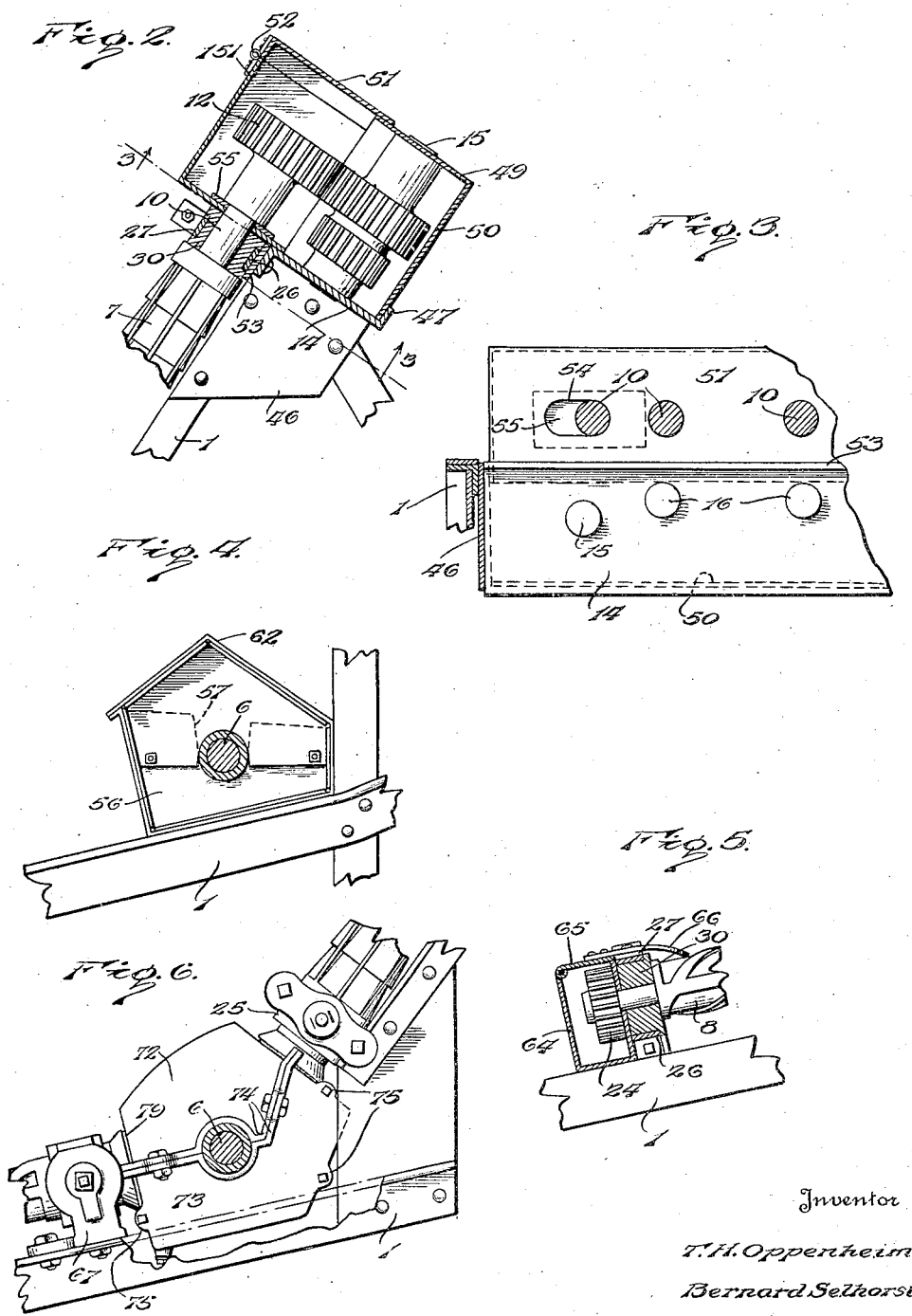

T. H. OPPENHEIM ET AL 1,645,252

GEAR CASE FOR CORN HUSKERS

Filed Sept. 22, 1925    4 Sheets-Sheet 3

Inventor
T. H. Oppenheim
Bernard Selhorst
By Loery Lacey, Attorneys

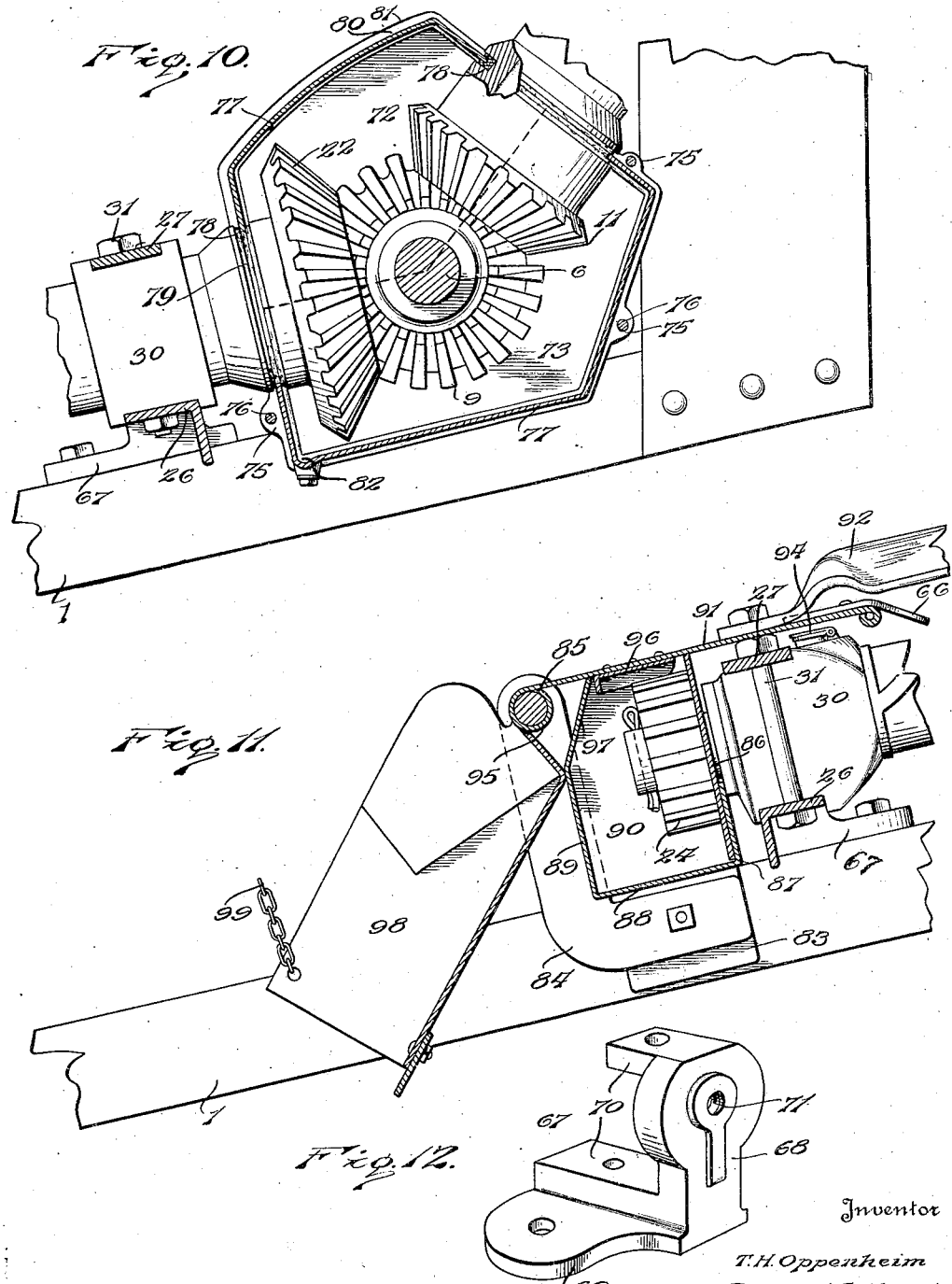

Patented Oct. 11, 1927.

1,645,252

UNITED STATES PATENT OFFICE.

THEODORE H. OPPENHEIM AND BERNARD SELHORST, OF COLDWATER, OHIO.

GEAR CASE FOR CORN HUSKERS.

Application filed September 22, 1925. Serial No. 57,877.

This application is a continuation in part of an application filed by us December 22, 1924, Serial No. 757,533.

One object of the present invention is to provide means for housing the gearing for the rolls of corn-husking machines whereby the gearing will be protected from damage by objects dropping thereon, may run in oil, may be readily cleaned, and will be easy of access. Another object of the invention is to facilitate the discharge of the husked ears, and other objects will appear incidentally in the course of the following description.

The invention is illustrated in the accompanying drawings and consists in certain novel features which will be particularly pointed out in the appended claims.

In the drawings:

Figure 1 is a plan view, with parts broken away and parts in section, of the rolls of a corn-husking machine showing one embodiment of the invention;

Fig. 2 is a vertical longitudinal section through the housing for the gearing at the upper ends of the snapping rolls;

Fig. 3 is a section on the line 3—3 of Fig. 2;

Fig. 4 is an end elevation of the housing for the central train of driving gears;

Fig. 5 is a detail section through the lower housing;

Fig. 6 is an end elevation showing a central housing differing in some details from the housing shown in Fig. 4;

Fig. 10 is a vertical section on the line 10—10 of Fig. 7;

Fig. 11 is a similar view on the line 11—11 of Fig. 8, and

Fig. 12 is a detail view of a bracket constituting the end member of a roll-supporting yoke.

Figure 7:
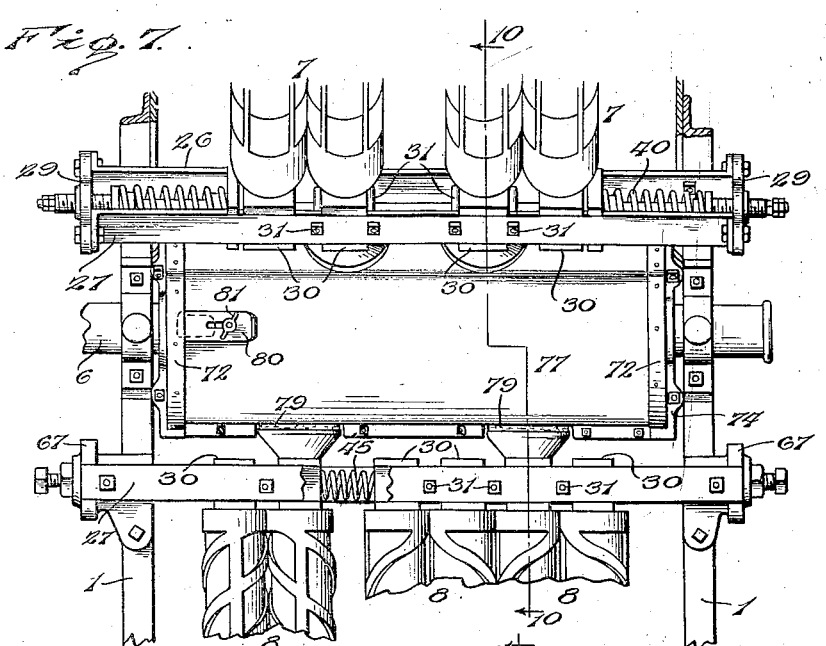
Fig. 7 is a plan view of the structure shown in Fig. 6.

In the drawings, the reference numeral 1 indicates the side bars of a supporting frame or bed for the rolls and 6 designates a shaft which is disposed transversely of the frame and passes between the lower ends of the snapping rolls and the upper ends of the husking rolls to constitute the main driving element for all the rolls, the shaft being rotated through any approved mechanism. Referring more particularly to Fig. 1, it will be noted that we have illustrated two sets of snapping rolls 7 and three sets of husking rolls 8. The particular number of snapping rolls and husking rolls is, of course, immaterial and the particular configuration of the rolls is of no moment for the purposes of our present invention. The rolls are disposed in pairs and in the operation of the machine the stalks are fed to and pass between the members of a pair of snapping rolls, the ears of corn being snapped therefrom. The ears of corn pass by gravity to and beyond the lower ends of the snapping rolls and are directed onto the husking rolls which grip the husks and feed the same between the rolls, the cleaned ears of corn passing longitudinally over the rolls and being delivered at the end of the machine.

The snapping rolls are secured upon or formed with shafts or trunnions, indicated at 10, and upon the lower trunnions of some of the rolls we secure bevel gears, as 11, which mesh with the opposite sides of a double driving gear 9 secured on the shaft 6. Upon the trunnions 10, at the upper ends of the snapping rolls, we secure spur gears, as 12. A bracket or plate 14 is secured to the frame immediately adjacent and below the upper trunnions of the snapping rolls and in this plate or bracket are secured stub shafts 15 and 16 which carry a train of gears whereby the gears upon the trunnions of the rolls are operatively connected. The inner snapping roll of each pair of rolls is positively driven through the gears 9 and 11 and the outer snapping roll is in turn driven through the train of gearing at the upper ends of the rolls. This train of gearing is very efficient inasmuch as the outer snapping roll is mounted for sliding movement relative to the inner snapping roll and the sliding of the outer roll will not destroy the intermeshing engagement of the gears, the gear 12 upon the sliding roll rolling upon the intermeshing gear of the train as the snapping roll moves inwardly or outwardly, and consequently the rotation of the rolls will be uninterrupted.

Outwardly beyond the gears 11, other bevel gears are secured upon the shaft 6 and mesh with bevel gears, as 22, secured upon trunnions at the upper ends of some of the husking rolls 8 and the lower ends of the husking rolls are operatively connected through spur gears 24.

Secured upon and extending across the husking machine frame are yokes which carry the bearings for the several rolls, the yokes being provided at both the upper and lower ends of the snapping rolls as well as the husking rolls. Each yoke consists of a lower bar 26 which is secured rigidly to the frame of the corn-husking machine, and an upper bar 27 which may be of the same form and dimensions as the lower bar and is arranged parallel therewith. The outer ends of the bars 26 and 27 shown in Fig. 1 are turned downwardly and upwardly, respectively, as at 28, and a cap plate 29 is secured to these turned or bent ends of the bars. The trunnions or shafts of the rolls are journaled in bearing blocks or boxes 30 which fit closely between the yoke members 26 and 27, and that block or box which receives the trunnion or journal of the outer roll has its upper and lower sides grooved whereby it may slidably engage the yoke bars 26 and 27. The block or box receiving the trunnion or shaft of the inner roll is, however, held against lateral movement by the stay bolts 31 inserted through the said bars adjacent the sides of the box. It will be readily understood that by this arrangement the outer roll may yield to the thickness of a stalk or other article passing between the rolls so that the proper operation of the parts will be effected, and springs 40 and 45 are provided to maintain the operative relation of the rolls.

The plate 14 forms the front bottom of a gear casing, the end walls of which may be provided by extended portions of gusset plates 46 which are secured to the upper corners of the main frame. The bottom plate is provided with a flange 47 along its edges whereby it may be easily bolted to the gusset plates, and the gusset plates are provided at their upper ends with flanges 48 to facilitate placing and securing the top plate 49, the top plate having openings therein to receive and support the ends of the stub shafts 15 and 16. The rear bottom of the gear casing is provided by a plate 50 which may be integral with the plate 49 and bolted or riveted to the flanges of the plate 14 and the gusset plates, while a cover 51 is provided for the front of the gear case. This cover is hinged, as at 52, to a top section 151, which is in the form of an open box adapted to fit over and enclose the gearing and rest against the bottom plate 14, the cover 51 extending to the plate 49. A plate 53 is secured upon and extends across the main frame below the yoke 25, abutting the bottom plate 14 to reinforce the latter. It is to be understood that the particular manner of securing the gear case to the frame of the machine is immaterial.

The bottom of the gear case constitutes a grease pan to contain lubricant which is preferably a heavy oil and the level of which normally extends from the upper or front corner of the bottom to the lower or rear edge of the top plate 49, the greater portion of the train of gearing being thereby submerged and the unsubmerged portion receiving sufficient lubricant from the submerged part. To accommodate the trunnion of the movable roll, the bottom plate of the section 151 is formed with slots or openings, as at 54, and a slide or sealing plate 55 is fitted about the trunnion to move therewith and cover the slot or opening at all times to prevent leakage. When cleaning of the pan is necessary, the top plate is removed thereby giving access to the gears which may be easily withdrawn, whereupon the grease may be scraped from the pan. When the gears and top plate have been restored, it is a very simple matter to pour grease into the pan.

Between the side bars of the main frame, we provide a pan or trough 56 below the main shaft 6, the ends of this pan being secured to the frame side bars in any preferred manner and being provided in their upper edges with notches 57 to fit closely about the shaft. A sealing plate 58 is provided to cover the openings 59, provided in the front wall of the pan for the trunnions of the husking rolls, and prevent leakage of the lubricant placed in the pan. A box-like cover 62 is secured upon the pan with its end walls overlapping the end walls of the pan about the shaft 6, as shown in Fig. 4, and in the top of the cover are slots 63 to accommodate the trunnions of the driving snapping rolls. These slots are normally covered by a plate 64 which is removable to permit the lubricant to be replenished through the slots.

Secured to the machine frame so as to enclose the gears 24 is a box 64 which has a bottom, front, back, and end walls, and is located directly beneath the shield 65 by which the ears of corn are directed from the husking rolls onto the ear conveyer, said shield serving as a cover for the box, it being noted that the shield 65 has guide fingers 66 secured thereto and projecting forwardly over the ends of the husking rolls to direct the ears of corn out of the bight of the husking rolls.

It will be noted that the gearing for the rolls is all enclosed so that all the parts are protected from damage due to falling objects, will be kept from dirt falling from above as well as dust rising from below, and will run in lubricant so that they will operate easily and with minimum wear.

In the foregoing description, reference has been had particularly to the details shown in Figs. 1 to 5 inclusive, but we do not limit ourselves to such details and in Figs. 6 to 12 have shown some variations which may be preferred. For instance, instead of using straps 29 to close the ends of the yokes, we may employ brackets 67, one of which is shown in detail in Fig. 12. This bracket is a single integral casting including a short standard 68, a lateral base plate 69 at the lower end of the standard, and flat leaves 70 on its inner side at its upper and lower ends, a threaded opening 71 being formed through the standard. The ends of the yoke bars rest upon and are bolted to the leaves 70, and the base 69 rests upon and is bolted to the side bars of the machine frame, the opening 71 providing a bearing for the spring-adjusting screw. This construction is stronger than that previously described and permits the yoke to be assembled before being placed in the machine inasmuch as the securing bolts are not inserted through the lower yoke bars but are inserted through the base plates 69 at one side of the yoke bars.

The first described constructions contemplated the production of a gear case of sheet metal throughout, the walls of the case having openings cut therein for the several shafts and fitting around the shafts to serve as washers between the ends of the bearings and the hubs of the gears. Of course, other constructions may be employed and we have shown, in Figs. 6, 7 and 10, a gear case in which the ends are castings and the sides are of sheet metal. Each end comprises a top casting 72 and a bottom casting 73 having counterpart opposed edges provided with notches or recesses whereby they may be fitted about the bearing for the driving shaft 6. Mating flanges 74 are formed along said edges and the castings are secured together by bolts inserted through said flanges in an obvious manner. The castings 73 are also provided with lugs 75 through which long bolts or clamping rods 76 are fitted to cause the end members to clamp the side walls 77. The walls 77 are, of course, provided with openings to receive the bearings for the trunnions of the actuating rolls, and said bearings are provided with circumferential grooves 78 in which packing 79 of felt or other material is placed so that when the members or sections of the case are secured together, the edges of the walls will be wedged in the grooves and the packing, and tight joints effected to prevent leakage of lubricant, the case being carried by the bearings. A leak-proof joint is provided around the bearing for the main driving shaft 6 in the same manner and like packing may be employed between the flanges 74. In the top of the case is an opening for the admission of oil, and a plate 80, held in place by a set bolt and wing nut 81, normally covers said openings. In the bottom of the case is a groove or gutter 82, or a plurality of such grooves, leading to a point of discharge which is normally closed by an ordinary drain plug (not shown). Removal of the drain plug permits the case to be drained. After the grease has been drained out, the plug is replaced and oil or gasoline poured into the case. The gears are then run for a short period so that all dirt and remaining grease will be worked to the bottom of the case whereupon removal of the drain plug will permit the case to be drained. When the plug is restored, the case may be filled with a fresh supply of clean lubricant.

Figure 8:
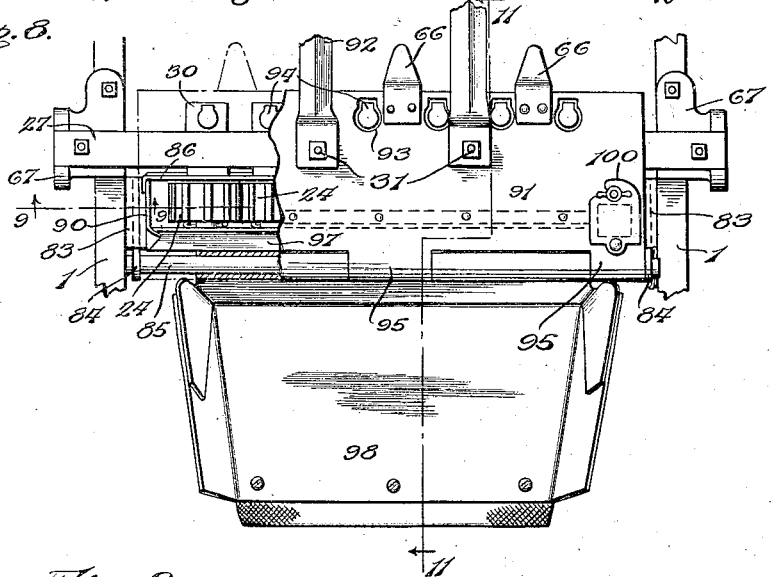
Fig. 8 is a plan view of a lower housing or case differing in some details from that shown in Figs. 1 and 5.
Figure 9:
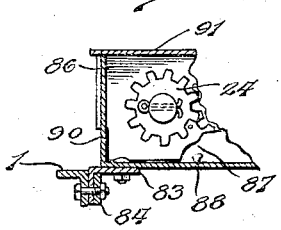
Fig. 9 is a detail section on the line 9—9 of Fig. 8.

Referring now particularly to Figs. 8, 9 and 11, it will be noted that the ends of the lower gear case are secured to right angle brackets 83 which are in turn secured to the side bars 1 of the machine frame. Other brackets 84 are secured to the frame by the same bolts that secure the brackets 83 thereto and rise at the front of the case to carry a cross rod 85. The case comprises a back plate 86 provided with openings whereby it may be fitted on the trunnions at the lower ends of the husking rolls, against the bearings therefor. The case also includes a box or trough consisting of a short back wall 87, a bottom 88, a front wall 89, and end walls 90 integrally united. In assembling these parts, the trunnions of the husking rolls are engaged through the bearing blocks in the yoke, and the back plate 86 is slipped over the trunnions. The gears are then secured on the ends of the trunnions, after which the box or trough, with lubricant in it and the brackets 83 secured thereto, is raised into position so that the back plate 86 will pass into the box, the brackets 83 being then bolted rigidly to the main frame. The cover 91 consists of a plate of proper dimensions to extend over the entire box and the yoke, and is rigidly secured upon the yoke by the stay bolts 31 therein. The ear-guiding fingers 66 are permanently attached to the cover at the back end thereof, and the lower ends of the divider bars 92 are also secured upon the cover at the back edge thereof. The cover is also provided with openings 93 giving access to the oil cups 94 in the bearings 30 whereby lubricant is supplied to the bearings. The front edge of the cover has rolled portions 95 around the rod 85 so that the cover is firmly supported in its proper position, and on the under side of the cover is secured a strip 96 which returns to the case any grease thrown up by the gears 24 and the respective retaining cotter pins and prevents such grease running along the cover. The upper portion of the front wall 89 is bent toward the gears, as at 97, to prevent grease being thrown out by the centrifugal action.

The husked ears pass over the cover 91 into a chute 98 which directs them into a conveyer by which they are carried to a bin or other receptacle. The chute is hingedly supported on the rod 85 and its front end may be suspended from the operator's platform by a chain 99 so that it may be raised and prevented from digging into the bottom of the conveyer when the latter is folded.

Grease is fed into the case through an opening in the top thereof which is normally closed by a cover 100.

Having thus decribed the invention, we claim:

1. In a corn-husking machine, the combination of a yoke carrying bearings for rotary elements, gear connecting the ends of said elements, a box housing the gears, a cover extending over the box and the yoke, and an ear chute hingedly supported at the edge of the cover opposite the rotary elements.

2. In a corn-husking machine, the combination of a yoke carrying bearings for rotary elements, gear connecting the ends of said elements, a box housing the gears, a cover extending over the box and the yoke, and ear-guiding fingers secured to the cover at the back edge thereof, the lower ends of divider bars being also secured upon the cover.

3. In a corn-husking machine, the combination of a yoke carrying bearings for rotary elements, gears connecting the ends of said elements, a box housing the gears, a cover extending over the box and the yoke, and an ear chute hingedly supported at the side of the box opposite the rotary elements.

4. In a corn-husking machine, the combination of a yoke carrying bearings for rotary elements, a box housing the gears, a cover extending over the box and the yoke, and ear guides projecting from the back edge of the cover over the yoke and the ends of the rotary elements.

In testimony whereof we affix our signatures.

THEODORE H. OPPENHEIM. [L. S.]
BERNARD SELHORST. [L. S.]